United States Patent Office 3,594,231
Patented July 20, 1971

3,594,231
BATTERY WITH POLY(AZOBISFORMAMIDES) DEPOLARIZER
Charlotte Marie Kraebel, Somerville, N.J., assignor to American Cyanamid Company, Stamford, Conn.
No Drawing. Filed July 23, 1969, Ser. No. 844,208
Int. Cl. H01m 15/06
U.S. Cl. 136—6                                        4 Claims

ABSTRACT OF THE DISCLOSURE

Poly(biureas) are formed by the reaction of polyisocyanates with semicarbazides, and by other syntheses. The poly(biureas), which are polyhydrazo compounds, are readily reversibly oxidized to the corresponding azo compounds. The oxidation-reduction reaction of the hydrazoazo moieties act as depolarizing reaction for primary and secondary battery cells, particularly zinc-carbon cells.

CROSS REFERENCES TO RELATED APPLICATIONS

U.S. Patent 3,357,865, Dry Cells, Stanley M. Davis, Charlotte M. Kraebel and Richard A. Parent disclose the use of N-substituted 1,1'-azobisformamides in dry battery cells as depolarizers.

Application Ser. No. 689,258, now Patent No. 3,481,692, a continuation-in-part thereof relates to substituted biurea in secondary cells.

This invention relates to novel bridged biureas, i.e. hydrazo compounds, and to their oxidized azo counterparts as well as to the use thereof in electric cells, for use in batteries. More particularly, it relates to a novel oxidizable-reducible, azo-hydrazo compound which in the reduced, i.e. hydrazo, forms is represented by the formula:

$$\left[ \begin{array}{c} R_1 \\ R_2 \end{array} \!\!\!\! N-\underset{O}{\underset{\|}{C}}-NHNH-\underset{O}{\underset{\|}{C}}-NH \right]_n \!\!\!\! -B$$

and in the oxidized, i.e. azo, form is represented by the formula:

$$\left[ \begin{array}{c} R_1 \\ R_2 \end{array} \!\!\!\! N-\underset{O}{\underset{\|}{C}}-N=N-\underset{O}{\underset{\|}{C}}-NH \right]_n \!\!\!\! -B$$

in which $R_1$ and $R_2$ are selected from the group consisting of hydrogen, alkyl of 1 to 8 carbon atoms, mono- and dicarbocyclic aryl, substituted aryl, cycloalkyl, aralkyl, alkoxyalkyl, cyanoalkyl, haloalkyl, nitroalkyl, alkenyl, and when both $R_1$ and $R_2$ are alkyl, may be joined directly, or through a nitrogen, sulfur or oxygen atom to form a heterocyclic ring, $n$ is a small whole number not less than 2 or more than 4, and B may be considered as a polyvalent bridge resulting from the reaction of a polyisocyanate having 2 to 4 isocyanate groups of an aliphatic or aromatic type in which —NH— linkages appear from the reaction of the isocyanate groups with semicarbazides so that isocyanates of the formula $B(NCO)_n$ appear as $B(NHCO)_n$— in the poly(azobisformamide) and poly(biurea) compounds produced. More specifically, the invention relates to compounds in which B is an $n$ valent radical selected from the group consisting of:

—$(CH_2)_m$— where $m$ is 1 to 10, including branched chain alkylene groups,

—$CH_2$—⌬—$CH_2$— , —⌬—⌬— , —⌬—S—⌬— , —⌬—S—⌬—

—$CH_2$— ⌬—N⟨⟩N—⌬ —$CH_2$—
      $CH_2$        $CH_3$   $CH_3$       $CH_2$—
                         $CH_3$

—$(CH_2)_pO(CH_2)_p$—, where $p$ is 1 to 5,
—$(CH_2)_pOCOO(CH_2)_p$—, where $p$ is 1 to 5;

$$N\!\!\left[\!(CH_2)_p\!\right]_3$$

where $p$ is 1 to 5;

$$R^1N\!\!\left[\!(CH_2)_p\!\right]_2$$

where $p$ is 1 to 5 and $R^1$ is 1 to 5 carbon alkyl;

$$R^1\!\!-\!\!C\!\!\left[\!(CH_2)_p\!\right]_3$$

where $p$ is 1 to 5, and $R^1$ is 1 to 5 carbon alkyl;

$$\left[(CH_2)_q\right]_2\!\!C\!\!\left[(CH_2)_p\right]_2$$

where $p$ is 1 to 5, and $q$ is 0 to 5;

⌬—$\left[CH_2\!\!-\!\!⌬\right]_r\!\!-\!\!CH_2$—⌬ where $r$ is 0 to 2;

—⌬—$R^1$ where $R^1$ is 1 to 5 carbon alkyl; and $R^1$—▭—$R^1$ (with H's at corners)

where $R^1$ is 1 to 5 carbon alkyl;

and where $p$, $q$, and $R^1$ appear more than once, they are not necessarily the same and to the use of such bridged azo-hydrazo compounds as depolarizers in electric cells. Surprisingly all such azo-hydrazo groups are effective in electric cells.

Conveniently the hydrazo compounds are synthesized first and converted to the azo compounds by oxidation.

Several methods for preparing the compounds exist. One involves reaction of a semicarbazide $$(R_1R_2NCONHNH_2)$$

with a haloformate ester such as the chloroformate (ClCOOR) to form the corresponding carbamoyl carbazate which is then oxidized and treated with a polyamine to form the bridged azo compound.

(1) 
$R_1R_2NCONHNH_2 + ClCOOR \longrightarrow R_1R_2NCONHNHCOOR + HCl$
semicarbazide    chloroformate ester    carbamoyl carbazate (2) then $+ [O] \longrightarrow R_1R_2NCON=NCOOR + H_2O$ (3) then $+ (H_2N)_nB \longrightarrow \left(R_1R_2NCON=NCOHN\right)_n\!\!-\!\!B + nROH$ where $R_1$, $R_2$, B, and $n$ are defined as above, and R is a nonreactive group, such as lower alkyl, and which does not appear in the final product. A poly(secondary amine)

may be used to give compounds in which the nitrogen adjacent to the B group are substituted as

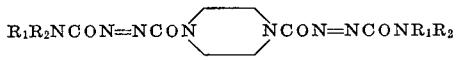
$R_1R_2NCON{=}NCON \phantom{xxx} NCON{=}NCONR_1R_2$

Another method involves reaction of a carbazate with a monofunctional isocyanate or a carbamyl chloride and subsequent reaction of the oxidized intermediate with a polyamine to form the bridged azo compound.

(4) $R_1N{=}C{=}O + H_2NNHCOOR \rightarrow$
$R_1NHCONHNHCOOR$, (5) then $+[O] \rightarrow R_1NHCON{=}NCOOR$,
then $+(H_2N)_nB \rightarrow$ (6) $(R_1NHCON{=}NCONH)_nB + nROH$, and (7) $R_1NHCOCl + H_2NNHCOOR \rightarrow$
$R_1NHCONHNHCOOR + HCl$, then as above, where $R_1$, $R_2$, B, R and $n$ are as above.

Both of these procedures involve unstable intermediates or reactants and are multi-step.

The preferred process for preparing the compounds of the present invention involves the reaction of semicarbazide, or an appropriately substituted derivative thereof, with a polyfunctional isocyanate to form the bridged hydrazo compound directly with subsequent oxidation thereof the the bridged azo compound. Thus, for example, a di-, tri- tetra or higher isocyanate is reacted with a semicarbazide to form the hydrazo compound which is then oxidized to the azo derivative.

The reactions involved may be illustrated by the following:

Formation of hydrazo compounds:

(8)

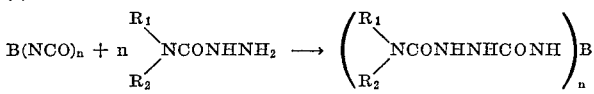

Formation of azo compound:

(9)

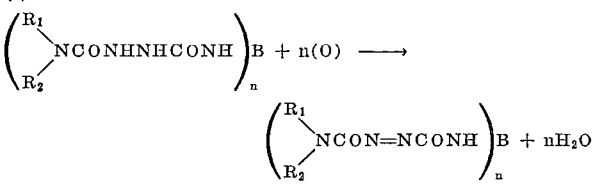

where $R_1$, $R_2$, B and $n$ are as above.

In the addition reaction, Equation 8, preferably a solvent and catalyst are present. The solvents that may be employed are those which are inert towards isocyanates, such as benzene, toluene, xylene, dimethylformamide, tetrahydrofuran, acetonitrile, etc. The amount of solvent employed is not critical, but preferably is sufficient to dissolve the reactants. A convenient amount is usually from about 2 to 10 times the total amount of reactants present by weight. Catalysts that give good results are tertiary amines such as pyridine, picoline, collidine, lutidine, trimethylamine, trethylamne, tri-n-propylamne, etc. The amount of catalyst is also not critical and may vary from about 1 to about 10% based on the weight of the reactants.

Formation of the hydrazo compound (Equation 8), is preferably accomplished by adding the polyisocyanate in a solvent to a stirred mixture of the semicarbazide and the catalyst in the reaction solvent. The mole ratio of the semicarbazide to diisocyanate should be at least 2 to 1. An excess of the semicarbazide is preferred, which may vary from about 10% to about 100% in excess of the stoichiometric requirements. Adding the diisocyanate to the semicarbazide solution minimizes undesirable side reactions, such as polymerization.

A temperature in the range of about 25° to 100° C. gives preferred results. A reaction time of about 1 hour after addition of the reactants is generally sufficient. The solid product thus formed may then be separated from the solvent.

In place of the isocyanate used in the above method, the correspondiang carbamoyl chloride derivative may also be applied as a starting material for reaction with semicarbazides to form the corresponding biureas by splitting out of HCl (instead of involving an addition reaction between the isocyanate radical between the isocyanate radical and the semicarbazide). In the latter instance an acid binding agent is normally employed such as sodium carbonate, pyridine, etc.

Oxidation, shown in Equation 9, is effected by oxidizing agents. One effective oxidizing system involves the use of an inorganic nitrate and optionally a metallic catalyst in the presence of acetic acid, as described in U.S. Patent No. 3,017,406. Another is by nitric acid as shown in J. Chem. Soc. 127, 381 (1925) and Ber. 44, 3020 (1911).

My compounds may be employed as blowing agents in the production of foamed polymers by virtue of their decomposition at or near their melting points. The compounds vary as to decomposition temperature, depending upon the substituents making up the individual compounds and whether they are the hydrazo or azo type. The azo compounds generally decompose at lower temperatures than the corresponding hydrazo compounds. Thus, within the class of compounds described, the individual members encompass a wide range of decomposition temperatures so as to provide blowing agents chosen to meet rigid specifications in special uses. Certain typical temperatures are shown below.

The novel compounds of the present invention are particularly useful as depolarizers in electric cells.

The use of azodicarbonamide $(NH_2CON{=}NCONH_2)$ as a depolarizer in magnesium-anode electric cells is disclosed in U.S. Pat. No. 2,836,644. Improved hydrolytic stability and storage stability of cells is obtained by the use of alkyl and aryl substituted derivatives of azodicarbonamide as disclosed in said Pat. No. 3,357,865. While the use of substituents on the amide nitrogen helps to overcome stability problems of the azodicarbonamide system in electric cells, the substituents increase the equivalent weight of the depolarizer, such that the theoretical and practical capacity obtainable with these substituted azodicarbonamides in the construction of a cell of specific size is limited. For example, in an AA cell containing 3.0 grams of azodicarbonamide as depolarizer, the theoretical capacity is 1385 milliampere hours. Employing the same weight of N,N'-diphenylazodicarbonamide [1,1' - azo-bis(N-phenylformamide)] in a similar cell, the theoretical capacity is only 41% of 1385 that is 568 milliampere hours. To obtain the same theoretical capacity requires 7.35 grams of the substituted compound. It is not feasible to pack this amount of depolarizer into an AA cell. Therefore the theoretical capacity of the cell is less than that of one containing the unsubstituted compound. As the substituent groups become heavier, the loss of capacity increases.

The compounds of the present invention are insoluble as a class and offer improved hydrolytic stability with even the simplest of substituents. Thus, within the class there are available compounds that have a wide range of stability and insolubility. N,N' - hexamethylenebis[1-(methylcarbamoylazo)formamide] in an electric cell has good shelf life, also good capacity.

The invention is more fully illustrated by the examples which follow.

Example 1.—Preparation of 1,1'-hexamethylenebis (6-methylbiurea)

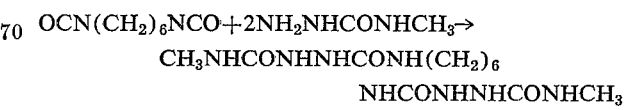
$OCN(CH_2)_6NCO + 2NH_2NHCONHCH_3 \rightarrow$
$CH_3NHCONHNHCONH(CH_2)_6$
$NHCONHNHCONHCH_3$ To 18.8 g. (0.25 mole) 4-methylsemicarbazide, 1 ml. pyridine and 250 ml. N,N-dimethylformamide, heated to 80° C., was added slowly with stirring 16.8 g. (0.10 mole) hexamethylene diisocyanate in 25 ml. N,N-dimethylformamide. After the addition was complete the mixture was stirred for an additional hour at 80° C. The white solid which separated was recovered by filtration and washed with dimethylformamide and ethanol, giving 29.9 g. (94% of theory) of product which decomposed at 252–253° C.

Example 2.—Preparation of N,N'-hexamethylenedis[1-(methylcarbamoylazo)formamide]

Into a reactor was charged 5.0 g. of the product of Example 1, 5.0 g. ammonium nitrate, 0.5 g. cupric acetate monohydrate and 30 ml. glacial acetic acid. The mixture was heated to 65° C. and an additional 20 ml. glacial acetic acid was added to reduce the viscosity of the mixture. The mixture was then heated to 105° C. and an additional 1.0 g. ammonium nitrate and 10 ml. glacial acetic acid were added. The mixture was heated to 110° C. and drowned in water yielding a flesh colored solid. The solid was taken up in about 75 ml. boiling dimethylformamide and drowned in about 500 ml. water to give 2.3 g. of the desired compound which had a decomposition temperature of 188–190° C.:

$$CH_3NHCON=NCONH(CH_2)_6NHCON=NCONHCH_3$$

EXAMPLES 3–13

Bridged Biureas

Following the procedure of Example 1 but using the indicated intermediates, a number of other biurea compounds were prepared. The various preparations are summarized in the table which follows:

| Example No. | Semi-carbazide | Polyiso-cyanate | Decomp. temp., °C. | Compound name |
|---|---|---|---|---|
| 3 | A | 1 | 245-247 | 1,1-'-m-phenylenebis(6-phenylbiurea). |
| 4 | A | 2 | 250-252 | 1,1'-hexamethylenebis(6-phenylbiurea). |
| 5 | B | 1 | 233-235 | 1,1'-m-phenylenedibiurea. |
| 6 | C | 3 | 239-241 | 1,1'-[{5-[1-(2-methylcarbamoylhydrazino)formamide]-m-phenylene}bis(methylene-m-phenylene)}bis(6-methylbiurea). |
| 7 | B | 4 | 208-218 | 1,1'-(4-methyl-m-phenylene)dibiurea. |
| 8 | C | 1 | 238-240 | 1,1'-m-phenylenebis(6-methylbiurea). |
| 9 | B | 2 | 245-247 | 1,1'-hexamethylenedibiurea. |
| 10 | D | 5 | 268 | 1,1'-trimethylenebis(6-butylbiurea). |
| 11 | D | 2 | 262 | 1,1'-hexamethylenebis(6-butylbiurea). |
| 12 | D | 6 | ¹267 | 1,1'-[1,4-cyclohexylenebis(6-butylbiurea)]. |
| 13 | D | 7 | 270-271 | 1,1'-[m-phenylenedimethylenebis(6-butylbiurea)]. |

¹ Softens.

NOTE.—See following explanation of symbols:
Semicarbazides:
  A is 4-phenylsemicarbazide.
  B is semicarbazide.
  C is 4-methylsemicarbazide.
  D is 4-butylsemicarbazide.
Polyisocyantes:
  1 is m-phenylene diisocyante.
  2 is hexamethylene diisocyanate.
  3 is (5-isocyanate-m-phenylene)bis (methylene-m-phenylene isocyanate).*
  4 is 4-methyl-m-phenylene diisocyanate.
  5 is trimethylene diisocyanate.
  6 is 1,4-cyclohexylene diisocyanate.
  7 is m-xylylene diisocyanate.

*This compound is commercially available as PAPI, a polyarylene polymethylene isocyanate corresponding to the formula:

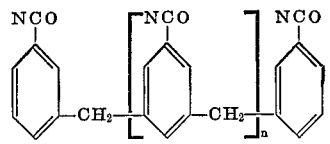

wherein n is approximately 1.

EXAMPLES 14–20

Bridged Azos

Following the procedure of Example 2 azo derivatives from the biureas of the previous examples were prepared. These preparations are summarized as follows:

TABLE II

| Example No. | Biurea from Ex. | Decomp. temp.,° C. | Compound name |
|---|---|---|---|
| 14 | 3 | 183-190 | N,N'-m-phenylenebis[1-(phenylcarbamoylazo)formamide]. |
| 15 | 5 | 215-220 | N,N'-m-phenylenebis[1-(carbamoylazo)formamide]. |
| 16 | 8 | 142-147 | N,N'-m-phenylenebis[1-(methylcarbamoylazo)formamide]. |
| 17 | 10 | 202 | N,N'-trimethylenebis[1-(butyl carbamoylazo)formamide]. |
| 18 | 11 | 187 | N,N'-hexamethylenebis[1-(butylcarbamoylazo)formamide]. |
| 19 | 12 | 245 | N,N'-(1,4cyclohexylene)bis[1-(butylcarbamoylazo)formamide]. |
| 20 | 13 | 172 | N,N'-(m-phenylenedimethylene)bis[1-(butylcarbamoylazo)formamide]. |

The decomposition temperatures of the azo and hydrazo compounds of this invention gives an indication of the temperatures at which the materials are most effective as blowing agents.

Similarly, the solubility in a battery cell electrolyte gives a rapid indication of the probable storage or shelf life of a cell constructed using the azo compounds as depolarizers. The present bridged compounds are much more insoluble than the monomeric azobisformamides of a similar equivalent weight, and hence much greater storage life for cells is obtained. Typical solubilities are shown in the table below:

TABLE III.—SOLUBILITY DATA

| Compound | Equivalent weight | Solubility, mg./l. of electrolyte* |
|---|---|---|
| 1. N,N'-hexamethylenebis[1-(methylcarbamoylazo)formamide]. | 85.6 | 10 |
| 2. 1,1'-azobis(N,N-dimethylformamide). | 86 | 19,100 |
| 3. 1,1'-azobis(N-ethylformamide). | 86 | 9,100 |
| 4. 1,1'-azobis(N-propylformamide). | 100 | 330 |
| 5. 1,1'-azobis(N-isopropylformamide). | 100 | 1,360 |
| 6. N-n-butyl-N'-methyl-1,1'-azobisformamide. | 93 | 460 |
| 7. 1,1'-azobis(N-allylformamide). | 98 | 1,700 |
| 8. N,N'-m-phenylenebis[1-(methylcarbamoylazo)formamide]. | 83.6 | 52 |
| 9. N-methyl-N'-phenyl-1,1'-azobisformamide. | 103 | 590 |
| 10. N-methyl-N'-phenyl-1,1'-azobisformamide. | 110 | 221 |

* Electrolyte in 17% ZnCl₂, 27% NH₄Cl and 56% H₂O by weight.

Said Patent 3,357,865 gives detailed information on the construction of cells, and requirements. Such patent is herein incorporated by reference.

Cells using the present compounds can be used as both primary and secondary cells. If prepared with the bridged compounds in the azo form, the cells are good primary cells with good shelf life. Advantageously the cells are utilized as secondary cells, and rechargeability greatly reduces the effective cost of the cells under conditions where rechargeability is feasible. Unexpectedly, the compounds in the hydrazo form can be used for the manufacture of secondary cells, which are very storage stable, and can be charged just prior to initial use.

The present cells have excellent deep discharge characteristics. That is the cells may be completely discharged, and then recharged without damage to the cell. Many cell systems have such characteristics that deep discharge reduces or ruins the cells for further use. From the standpoint of a casual user, it is highly advantageous to be able to run the cell in a circuit until the voltage fails, rather than have to continuously monitor the state of charge so that cell use can be stopped before irreversible changes occur.

While all of the compounds are usable in cells under similar conditions, to avoid unduly extending the length of this disclosure, only a few are set forth by example.

Similar results are obtainable with other of the compounds. Similarly, the biureas may be loaded in the cells, and converted to the azo bridged form by charging. The use of a metal oxide, such as zinc oxide or barium oxide, is advantageous, for such cells as such metal oxide serves as an absorber for hydrogen ions released during the charging.

Example 21.—Evaluation in electric cell

Cathodic mix:

0.428 gm. m-phenylenebis[1-(methylcarbamoylazo)formamide]
0.50 gm. carbon black (SA 40–220) (Columbian Carbon Co.)
2.0 ml. 17% $ZnCl_2$, 27% $NH_4Br$, 56% $H_2O$ Cell construction:

A glass cylinder was enclosed at one end with carboxymethyl cellulose coated kraft paper to which a strip of α-cellulose was attached. On the outside of the α-cellulose was placed a strip of pure zinc metal. The cathode mix was placed in the enclosed glass cylinder and a weighted carbon rod was inserted as a contact to the cathode mix. The cylinder was then stoppered at the top. The completed cell was dipped in the electrolyte for 15–30 seconds and then placed in an atmosphere saturated with electrolyte vapor. The cell was continuously discharged through a 24-ohm resistor to 0.96 v., having had an initial voltage of about 1.4 v. 77% of theoretical capacity of the cell was realized.

The cell was charged, and on similar discharge had about 43% of capacity on the second discharge, and when repeatedly cycled, had 13% of capacity on the 15th discharge.

Example 22

An evaluation cell was prepared with the following cathodic mix:

0.5 gm. N,N'-(1,4-cyclohexylene)bis [1-(butylcarbamoylazo)formamide]
0.5 gm. carbon mark (SA 40–220)
1.5 ml. of 17–27–56 electrolyte Following the procedure of Example 21, the cell was discharged through a 50 ohm resistor to a cut-off of 0.8 v. at which 81.2 milliampere-hr. was obtained. This is 76% of the theoretical capacity. The cell was charged and recycled; with results as shown:

| Cycle | drain, ohms | Milliampere-hr. (to 0.8 v.) | Efficiency, percent |
|---|---|---|---|
| 2 | 50 | 92.8 | 87 |
| 3 | 50 | 92 | 86 |
| 8 | 50 | 92.4 | 86 |

The cell was functioning in a similar manner after 10 cycles, at which point the experiment was stopped.

Example 23

Similarly an evaluation cell was prepared, following the procedure of Example 21 with a cathodic mix of:

0.503 gm. of N,N'-trimethylenebis[1-(butylcarbamoylazo)formamide] (Example 17)
0.50 gm. Carbon black (SA–40 220)
Electrolyte 17% $ZnCl_2$, 27% $NH_4Cl$, 56% $H_2O$ (enough to saturate)

The cell was placed on a 50 ohm discharge during which 117 milliampere hour was obtained to 0.80 v. This is 91% of the 129 milliampere hour theoretically possible.

The cell was charged and discharged for 10 cycles; the output during the 10th cycle was 29 milliampere hour (23%).

Example 24

Similarly an evaluation cell was prepared using N,N'-hexamethylenebis[1 - (methylcarbamoylazo)formamide] which gave 68% of theoretical capacity on the first discharge, 35% on the second, and 25% on the 27th.

Example 25

An uncharged cell was constructed following the procedure of Example 21, but adding 0.25 gm. of zinc oxide. The cell is storage stable. After charging the cell, and thus converting the biurea (hydrazo) form to the azo form, the cell on high drain discharge, at about 100 milliamperes, showed about 35% of theoretical capacity.

I claim:

1. In a rechargeable electric cell comprising, in combination, a metallic anode, a cathode composition comprising a mixture of carbon and an organic depolarizer, and an aqueous metal salt electrolyte; the improvement wherein the organic depolarizer is a readily oxidizable-reducible, azo-hydrazo compound which in the reduced, i.e. hydrazo, form is represented by the formula:

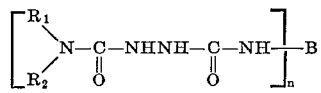

and in the oxidized, i.e. azo, form is represented by the formula:

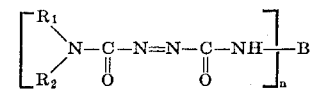

in which $R_1$ and $R_2$ are selected from the group consisting of hydrogen, alkyl of 1 to 8 carbon atoms, mono- and dicarbocyclic aryl, substituted aryl, cycloalkyl, aralkyl, alkoxyalkyl, cyanoalkyl, haloalkyl, nitroalkyl, alkenyl, and when both $R_1$ and $R_2$ are alkyl, may be joined directly, or through a nitrogen, sulfur or oxygen atom to form a heterocyclic ring, $n$ is a small whole number not less than 2 or more than 4, and B is an $n$ valent radical selected from the group consisting of:

—$(CH_2)_m$— where $m$ is 1 to 10, including branched chain alkylene groups,

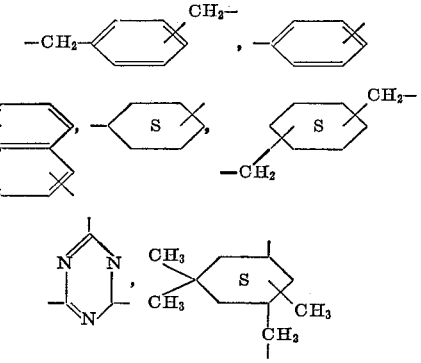

—$(CH_2)_pO(CH_2)_p$—, where $p$ is 1 to 5,
—$(CH_2)_pOCOO(CH_2)_p$—, where $p$ is 1 to 5;

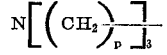

where $p$ is 1 to 5;

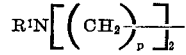

where $p$ is 1 to 5 and $R^1$ is 1 to 5 carbon alkyl;

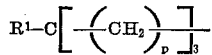

where $p$ is 1 to 5, and $R^1$ is 1 to 5 carbon alkyl;

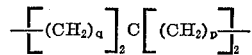

where $p$ is 1 to 5, and $q$ is 0 to 5;

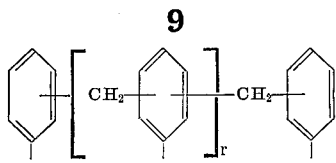

where r is 0 to 2;

where $R^1$ is 1 to 5 carbon alkyl; and

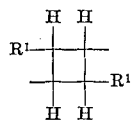

where $R^1$ is 1 to 5 carbon alkyl;

and where p, q, and $R^1$ appear more than once, they are not necessarily the same.

2. The electric cell of claim 1 in which the anode is zinc, and the depolarizer is m-phenylenebis[1-(methylcarbamoylazo)formamide].

3. The electric cell of claim 1 in which the anode is zinc, and the depolarizer is N,N'-trimethylenebis[1-(butylcarbamoylazo)formamide].

4. In a rechargeable electric cell comprising, in combination, a metallic anode, a cathode composition comprising a mixture of carbon and an organic depolarizer, and an aqueous metal salt electrolyte; the improvement wherein the organic depolarizer is a readily oxidizable-reducible, azo-hydrazo compound which in the reduced, i.e. hydrazo, form is represented by the formula:

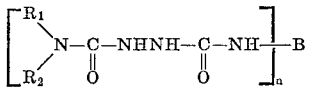

and in the oxidized, i.e. azo, form is represented by the formula:

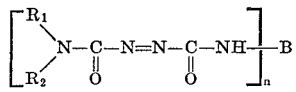

in which $R_1$ and $R_2$ are selected from the group consisting of hydrogen, alkyl of 1 to 8 carbon atoms, mono- and dicarbocyclic aryl, substituted aryl, cycloalkyl, aralkyl, alkoxyalkyl, cyanoalkyl, haloalkyl, nitroalkyl, alkenyl, and when both $R_1$ and $R_2$ are alkyl, may be joined directly, or through a nitrogen, sulfur or oxygen atom to form a heterocyclic ring, n is a small whole number not less than 2 or more than 4, and B is a bridging linkage of valence n, each such valence bond being linked to a separate carbamoyl group which is attached to an azo group in the oxidized form, and an hydrazo group in the reduced form.

References Cited
UNITED STATES PATENTS

| | | | |
|---|---|---|---|
| 2,306,927 | 12/1942 | Arsem | 136—137 |
| 3,357,865 | 12/1967 | Davis et al. | 136—137 |
| 3,481,792 | 12/1969 | Davis et al. | 136—137 |

DONALD L. WALTON, Primary Examiner

U.S. Cl. X.R.

136—137